United States Patent [19]

Kirkpatrick et al.

[11] Patent Number: 4,610,760

[45] Date of Patent: Sep. 9, 1986

[54] THREE-FLUID ATOMIZING NOZZLE AND METHOD OF UTILIZATION THEREOF

[75] Inventors: Paul A. Kirkpatrick, Jackson; Marvin Schulman; Douglas M. Lehmann, both of Howell; Joseph L. Hegadorn, Ridgewood, all of N.J.

[73] Assignee: General Foods Corporation, White Plains, N.Y.

[21] Appl. No.: 643,925

[22] Filed: Aug. 24, 1984

[51] Int. Cl.⁴ ............................................... B01D 1/18

[52] U.S. Cl. .................................... 159/4.01; 159/4.4; 159/48.1; 239/8; 239/422; 239/424; 239/426; 239/524; 426/471

[58] Field of Search ................. 239/8, 9, 11, 398, 418, 239/422, 423, 424, 426, 428, 461, 518, 524, 290, 434; 426/471, 474; 159/3, 4.01, 4.1, 4.4, 48.1

[56] References Cited

U.S. PATENT DOCUMENTS

| | | | |
|---|---|---|---|
| 696,057 | 3/1902 | Lanstrum | 239/524 |
| 1,597,715 | 8/1926 | Blackburn | 239/518 |
| 1,901,954 | 3/1933 | Fruth | 239/524 |
| 1,926,651 | 9/1933 | Rombach | 239/524 X |
| 2,044,296 | 6/1936 | Hardgrove | 239/514 X |
| 2,778,685 | 1/1957 | Umbricht | 239/518 |
| 2,824,807 | 2/1958 | Laster et al. | 424/37 |
| 3,064,619 | 11/1962 | Fortman | 116/137 |
| 3,157,359 | 11/1964 | Fortman | 239/102 |
| 3,667,679 | 6/1972 | Weisenberger | 239/102 |
| 3,688,990 | 9/1972 | Liedberg | 239/524 |
| 3,923,248 | 12/1975 | Cresswell | 239/113 |
| 4,134,719 | 1/1979 | Velie | 431/171 |
| 4,284,242 | 8/1981 | Randell | 239/422 |

*Primary Examiner*—Joseph F. Peters, Jr.
*Assistant Examiner*—Michael J. Forman
*Attorney, Agent, or Firm*—Thomas R. Savoie; Thomas A. Marcoux; Daniel J. Donovan

[57] ABSTRACT

A fluid nozzle for the atomization of liquids and, more particularly, a three-fluid nozzle for effectuating a unique method of atomizing high viscosity liquids and difficult-to-spherize liquids which are to be spray-dried. Also disclosed is a novel method of atomizing high viscosity liquids and liquids which are difficult to spherize in an essentially two-step atomization sequence through the utilization of the inventive three-fluid atomizing nozzle.

15 Claims, 6 Drawing Figures

THREE-FLUID ATOMIZING NOZZLE AND METHOD OF UTILIZATION THEREOF

BACKGROUND OF THE INVENTION

1. Field of the Invention

The present invention relates to a fluid nozzle for the atomization of liquids and, more particularly, relates to a three-fluid nozzle for effectuating a unique method of atomizing high viscosity liquids and difficult-to-spherize liquids which are to be spray-dried. Furthermore, the invention also relates to a novel method of atomizing high viscosity liquids and liquids which are difficult to spherize in an essentially two-step atomization sequence through the utilization of the inventive three-fluid atomizing nozzle.

Conventional methods of spray-drying materials which contain solids dispersed in a solution or suspension, such as, for instance, gelatin, coffee extract, lemon juice and the like, generally involve the step of ejecting the solution or suspension which is to be spray-dried downwardly from a nozzle into a heated environment, such as into a drying tower. Thus, the spraying or ejection of the solution or suspension from the nozzle produces a formation of droplets or discrete liquid particles, wherein the droplets then fall downwardly through the drying tower, and in which the resultant rapid evaporation of water or other solvents from the material being spray-dried causes the formation of a substantially dry, particulate free-flowing material. For this purpose, numerous types of atomizing nozzle designs and spray-drying methods have been developed in the technology relating to the spray-drying of these various viscous solutions or suspensions, hereinafter referred to as liquids. However, considerable difficulties have been encountered in the formation of the droplets or small spheroids from the liquids being discharged from the atomizing nozzle. Quite frequently, in lieu of the formation of droplets or discrete particles in the heated atmosphere of the spray-drying tower, there are frequently encountered undesirable formations of filaments and other irregularly dried product shapes which render current spray-drying methods for liquids or slurries containing high percentages of solids concentrations to be uneconomical and, depending upon conditions, not even feasible. In particular, disadvantages which are encountered in prior art methods of spray-drying liquids of the type under consideration relate to the use of two-fluid nozzles; in effect, nozzles which eject the liquid which is to be spray-dried and an atomizing fluid, such as, for example, steam or air, wherein these fluids are usually atomized within the nozzles, and in which the liquids are restricted to only relatively low concentrations of solids dispersed therein to allow for functioning of the nozzles.

DISCUSSION OF THE PRIOR ART

Thus, with respect to most two-fluid atomizing nozzles which are commonly employed in the technology, especially nozzles which are constructed for high viscosity spray-drying, an atomizing fluid, such as pressurized air or steam is usually admixed with the liquid product within the nozzle in order to provide for atomization of the liquid, this typically resulting in low product densities and unsatisfactory economics in the manufacture of the spray-dried product.

In particular, considerable difficulties have been encountered in the spray-drying of gelatins through the application of atomizing nozzles and methods which are currently available in the art. The difficulty in the spray-drying of gelatin frequently results from the rapid surface drying of the material prior to the completion of the atomization of the gelatin liquid. For instance, Laster et al. U.S. Pat. No. 2,824,807, assigned to General Foods Corporation, teaches that this surface drying rate of the gelatinous material can be appreciably reduced by blowing or circulating cold air about the atomizing nozzle to thereby reduce the tower effects. Consequently, when employing this technology with high Bloom gelatins, of up to 200 Bloom; in effect, gelatins having a high gelling ability per unit weight of gelatin, can be spray-dried at up to 12% by weight of solids concentration. The percentages of any solids concentration in the gelatin in relatively low and can be significantly increased through the utilization of the three-fluid atomizing nozzle and method pursuant to the present invention as described in detail hereinbelow.

Although numerous types of atomizing nozzles have been designed for and many of which are presently widely employed for the atomization of different types of fluids, slurries or liquids which are to be spray-dried, such as gelatins, coffee extracts, lemon juice and the like, while others are used for atomizing liquid fuels for combustion purposes, the prior art atomizing nozzles are basically restricted to the spray-drying of fluids or liquids which contain only relatively low percentages of solids dispersed therein, generally up to 10 to 12% by weight of solids. When it is desired to spray dry liquids containing higher percentages of solids, it is necessary to employ atomizing nozzles at feed pressures often exceeding 1000 psig for the proper operation thereof. Consequently, the design and structure of such atomizing nozzles becomes extremely complex due to the high pressures required, and also necessitates the utilization of high-pressure supply systems for supplying the fluids to the nozzles, which are difficult to service and operate from an economical and technological standpoint.

Rombach U.S. Pat. No. 1,926,651 discloses a nozzle structure contained within an upright tubular hood, by means of which a jet of water is discharged axially within the hood and adapted to impinge against a baffle plate arranged so as to transversely extend above the hood so as to cause the formation an atomized spray of water projected generally radially outwardly for the spraying or misting of vegetables, flowers, produce and the like, and allowing any excess water to drip back down into the hood. This type of spray nozzle and baffle plate arrangement is not adapted for the atomization highly viscous liquids, such as gelatins or coffee extracts containing high percentages of solids dispersed in solution.

Fortman U.S. Pat. No. 3,157,359 discloses an atomizer structure including a nozzle incorporating a sonic or acoustic generator which will prevent contamination or clogging of the nozzle orifice during the ejection of an atomizing fluid and the liquid which is to be atomized. In this arrangement, the admixing of the atomizing fluid and of the liquid is effected within the nozzle structure and, although the use of an acoustic generator prevents or at least ameliorates clogging of any solids within the nozzle, the nozzle structure and function thereof is not adapted for the atomization of high viscosity liquids, such as liquids containing high concentrations of solids dispersed therein.

Velie U.S. Pat. No. 4,134,719 discloses a multiflame fuel burner nozzle structure for liquid and gaseous fuels in which the fuel is expelled under pressure from a nozzle orifice and admixed therein prior to discharge with an atomizing fluid, such as combustion air, and thereafter, subsequent to being ignited, impelled against a deflector or baffle plate which will cause the flame to be deflected radially outwardly. This type of two-fluid atomizing nozzle structure is not adapted for use with high viscosity fluids or liquids so as to enable these to be atomized under controlled conditions externally of the atomizing nozzle and thereafter adapted to be spray-dried as is contemplated by the present invention.

Randell U.S. Pat. No. 4,284,242 discloses a spray head or atomizing nozzle arrangement for spraying a thickened slurry, such as colliery tailings, through an annular orifice and which includes a central fluid or gas discharge opening causing the slurry to be admixed therewith and atomized and directed radially outwardly upon being impinged against a baffle plate positioned externally of the nozzle orifice. An external annular curtain of a fluid or gas is adapted to envelop the spray so as to cool the nozzle to prevent agglomeration of material. Although this can be broadly interpreted to constitute a three-fluid nozzle, the structure and design thereof does not lend itself to the atomization of a highly viscous liquid in a manner analogous to that of the present invention.

Similarly, among other publications, various atomizing nozzles of interest are disclosed in Hardgrove U.S. Pat. No. 2,044,296; Cresswell U.S. Pat. No. 3,923,248; Fortman U.S. Pat. No. 3,064,619; Lamstrum U.S. Pat. No. 696,057; and Wiesenberger U.S. Pat. No. 3,667,679.

None of these publications, and numerous other currently known atomizing nozzles which are or conceivably may be employed in the technology for the spray-drying of atomized fluids or liquids, are adapted for the spray-drying of liquids or slurries containing extremely high percentages of solids dispersed therein, and wherein such atomization can be implemented by the nozzles at relatively low feed pressures (frequently at atomization pressures of well below 100 psig).

SUMMARY OF THE INVENTION

In order to obviate the limitations and drawbacks normally encountered in prior art atomizing nozzles and methods, particularly those which are employed in the atomization of high viscosity liquids or fluids which are difficult to spherize, in order to enable such liquids to be spray-dried, the present invention contemplates the provision of a novel three-fluid nozzle which provides for the discharge of two separate atomizing fluids in addition to the high viscosity feed material or liquid which is to be atomized. The three-fluid nozzle effects atomization externally of the nozzle structure, however, due to the unique design thereof the atomization of the high viscosity fluid is not effected by the ambient conditions of the dryer in which the atomized liquid particles are dried.

In essence, the utilization of the inventive three-fluid nozzle for effecting fluid atomization externally of the nozzle contemplates the utilization of a first-pressurized atomizing fluid discharged through a central orifice; an annular discharge orifice for dispensing product material or liquid which is being atomized as it admixes with the first atomizing fluid; and a second pressurized atomizing fluid, thereby effecting an essentially two-step atomizing sequence under predeterminable and controllable conditions.

Basically, as the viscous liquid product which is to be spray-dried egresses from the inventive three-fluid nozzle, the first atomizing fluid, which is constituted of either pressurized steam or compressed air, depending upon the type of product being atomized, and which is injected into the inner flow annulus or conus formed by the discharged downwardly flowing liquid, will expand so as to impinge the liquid flow thereby producing a first coarse atomization of the liquid. This first atomization of the liquid results in the formation of particles which are essentially too coarse for appropriate and satisfactory spray-drying. An impact plate or deflector plate is positioned downstream of the nozzle so as to extend across the flow path of the coarsely atomized mixture constituted of the first atomizing fluid and the liquid, and is impacted by this mixture so as to change the direction of the flow thereof from vertically downwardly into a substantially lateral orientation; in essence, a radially outward propulsion of the atomized mixture particles. As the coarsely atomized particle flow, which is constituted of the admixed first atomizing fluid and the liquid which is to be atomized, is deflected radially outwardly from the circumferential edge of the deflector plate, the downward flow of the second atomizing fluid, which forms an annular fluid curtain about the deflector plate, and with the second atomizing fluid also being constituted of either compressed air or steam, impinges against the mixture so as to deflect its flow path downwardly and thereby effect a second, fine atomization of the product liquid particles. These finely atomized particles are contacted with a stream of heated air in a spray-drying tower in order to dry the particles. The outer atomizing fluid also serves the further function of insulating the liquid from any deleterious effects, such as drying caused by the dryer environment, within the atomization zone of the nozzle which could conceivably inhibit or adversely affect the atomization of the liquid.

Accordingly, it is a primary object of the present invention to provide a novel atomizing nozzle which will allow for the atomization of highly viscous and difficult to spherize liquids or slurries which are to be spray-dried.

It is a further object of the invention to provide a three-fluid atomizing nozzle of the type described which will effect atomization in a two-step sequence to thereby attain a high degree of control over the properties of the liquid being atomized.

Another object of the invention resides in the provision of a three-fluid atomizing nozzle as described herein which facilitates the controlled atomization of highly viscous liquids containing extensive percentages of solids dispersed therein, such as gelatins, coffee extracts or the like.

Still another object of the invention lies in the provision of a novel method of atomizing highly viscous liquids through the utilization of the inventive three-fluid atomizing nozzle, allowing for the atomizing of the liquids at relatively low feed pressures.

Other features and advantages of the invention may be readily ascertained from the following detailed description of preferred embodiments of the inventive three-fluid atomizing nozzle as set forth hereinbelow.

BRIEF DESCRIPTION OF THE DRAWINGS

Reference may now be had to the following detailed description of exemplary embodiments of a three-fluid atomizing nozzle adapted for the atomization of highly viscous and/or difficult to spherize liquids which are to be spray-dried, taken in conjunction with the accompanying drawings; in which.

DETAILED DESCRIPTION

Figure 1:
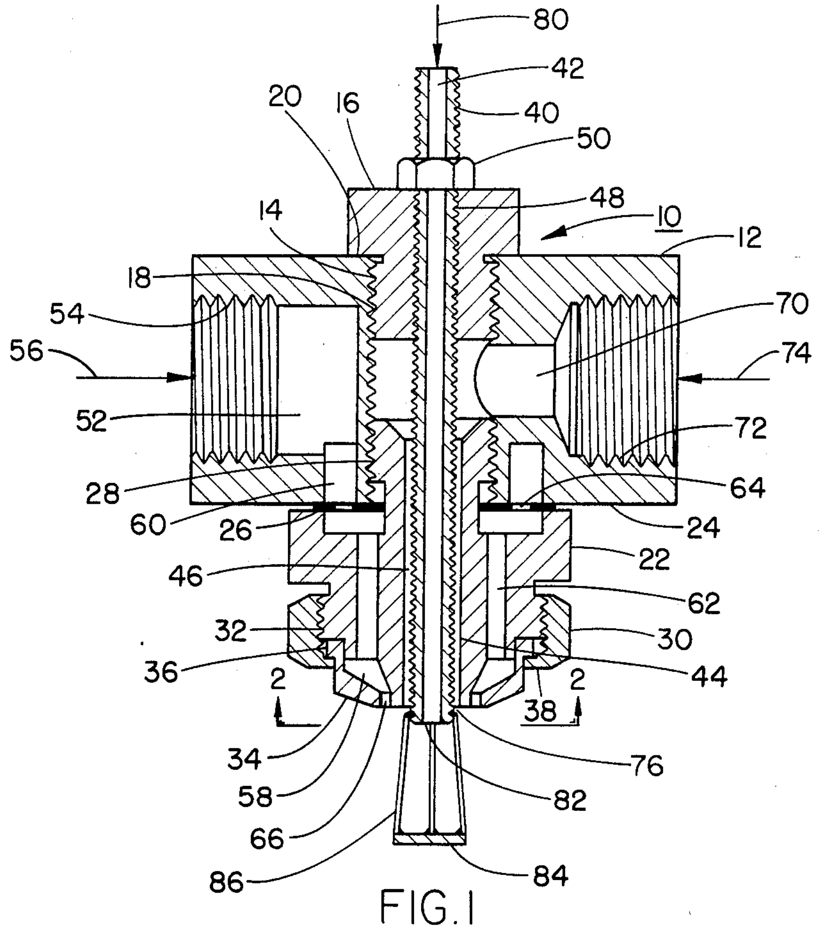
FIG. 1 is a longitudinal sectional view through a first embodiment of a three-fluid atomizing nozzle for the atomization of highly viscous liquids, constructed pursuant to the invention.
Figure 2:
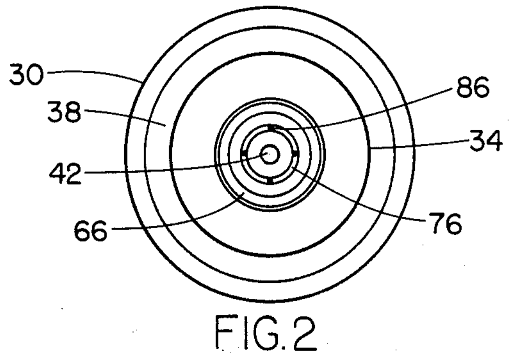
FIG. 2 is a transverse sectional view through the nozzle taken along line 2—2 in FIG. 1.

Referring now in detail to FIGS. 1 and 2 of the drawings, a first embodiment of a three-fluid atomizing nozzle 10, which may be constructed of stainless steel or the like so as to comply with the sanitary regulations of the food processing industry, includes a nozzle body 12 having a generally threaded, vertically extending central bore 14.

A vertically depending bushing 16, which has complementary screw threads 18 threadingly engaging the threaded bore 14, is screwed into the nozzle body 12 until a shoulder portion 20 thereof forming a bearing surface is seated on the upper surface of the nozzle body 12.

A lower bushing member 22 is retained in contact against the lower surface 24 of the nozzle body 12, with a suitable sealing gasket 26 interposed therebetween, and locked in position by being threaded through the engagement of external threads 28 on bushing 22, and a nut 30 screwed onto bushing member 22 through threads 32. The nut 30 also secures a nozzle orifice plate 34 through clamping engagement of an annular flange or shoulder 36 projecting into a recess formed between the lower portion of bushing member 22 and a radially projecting inwardly projecting annular lip 38 on the nut 30.

A central tubular member 40 incorporating a longitudinal through-bore 42 extends downwardly through a vertical central passageway 44 formed in the bushing member 22, and is dimensioned so as to provide an annular gap or space 46 therebetween. The tubular member 40 is shown with an external screw thread 48 along its length, of which a portion is in engagement with a complementary internal screw thread formed in the bushing 16. A suitable threaded lock nut 50 contacting the upper surface of the member 16 and screwed onto the external screw thread 48 of the tubular member 40 will provide for the appropriate vertical adjustment and locking of the tubular member 40 relative to the other structure within the nozzle body 12 of the three-fluid atomizing nozzle 10. Alternatively tubular member 40 may possess only a short threaded section for engagement with locknut 50, possess a smooth tapered section to fit tightly and securely within bushing 16 and possess a smooth, straight section through passageway 44.

In a first bore 52 formed in the nozzle body 12 there is provided an internally threaded portion 54 which is adapted to provide a connection with a supply line 56 and a supply source (not shown) for an atomizing fluid such as steam or compressed air. The bore 52 communicates with the internal annular space 58 in the nozzle orifice plate 34 by means of flow passageways 60 and 62 which communicate through one or more apertures 64 formed in the sealing gasket 26. An annularly extending gap or slot 66 formed by a space between the lower circumferential outer wall of bushing 22 and the radially inner lip of the nozzle orifice plate 34 provides an annular discharge orifice for the atomizing fluid introduced through the supply line 56 into the bore 52.

A second bore 70 in the nozzle body 12, which may be arranged diametrically opposite to the bore 52, but which is sealed off relative thereto, includes an internally threaded connecting portion 72 forming a connection with a suitable supply line 74 leading to a supply source (not shown) for liquid product which is to be atomized by the operation of the inventive three-fluid atomizing nozzle 10. The bore 70 communicates with the annular space 46 about the tubular member 40, which at the lower end thereof forms an annular nozzle orifice 76 extending between the outer circumferential wall of the tubular member 40 and the proximate inner circumferential wall on the bushing 22 so as to allow for the downward discharge of the liquid product through the annular nozzle orifice 76.

Another atomizing fluid, which may also be constituted of either steam or compressed air, depending upon the product being atomized, is introduced through a supply line 80, which is connected to the upper end of throughbore 42, from a suitable supply source (not shown), and is adapted to convey a flow of this atomizing fluid downwardly through the circular opening or nozzle orifice 82 at the lower end of the bore 42.

Positioned downstream and in spaced relationship with the lower end of the atomizing nozzle 10 so as to extend transversely thereof, is a deflector or impact plate 84 which, in this embodiment, is suspended from the lower end of the tubular member 40 through the intermediary of a plurality of circumferentially spaced thin connector rods 86 which may be welded thereto, and in this instance, shown to be four rods although other suitable number of rods may be employed. In this embodiment of the nozzle, the deflector or impact plate 84 is constructed of a substantially flat circular plate member, although other configurations may be employed as is illustrated and described with regard to the exemplary embodiments of FIGS. 3 through 5 of the drawings.

Figure 3:
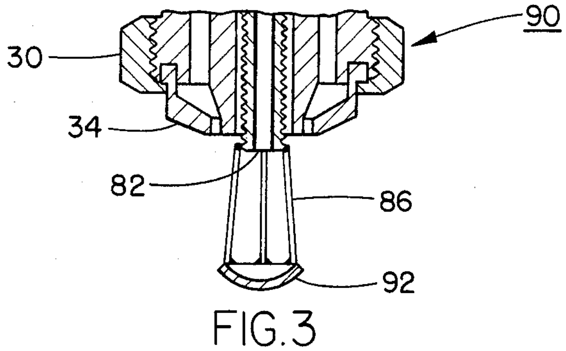
FIG. 3 is a fragmentary longitudinal sectional view of the fluid dispensing portion of a second embodiment of the three-fluid atomizing nozzle.
Figure 4:
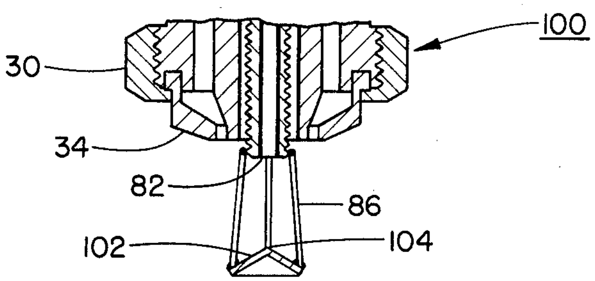
FIG. 4 is a view similar to FIG. 3 illustrating a third embodiment of the three-fluid atomizing nozzle.
Figure 5:
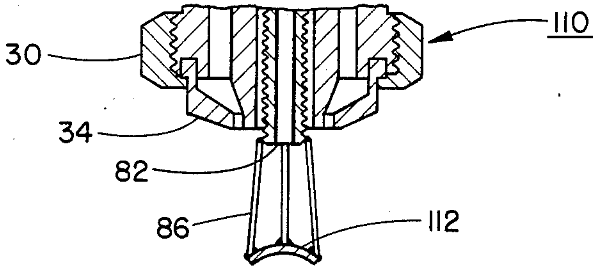
FIG. 5 is a sectional view similar to FIG. 3 illustrating a fourth embodiment of the three-fluid atomizing nozzle.

Referring to the embodiments of the nozzle shown in FIGS. 3 through 5 of the drawings, in which components identical with or similar to those shown in the embodiment of FIGS. 1 and 2 are designated by the same reference numerals; the atomizing nozzle 90 shown in FIG. 3 has a circular impact or deflector plate 92 arranged downstream of the discharge orifices wherein the plate 92 has a substantially concave or dished configuration in lieu of the flat surface as provided for by the deflector plate of FIGS. 1 and 2.

Similarly, the three-fluid atomizing nozzle 100 illustrated in FIG. 4 employs a substantially conical deflector plate 102, wherein the central apex point 104 of the plate 102 extends towards the discharge orifice 82, although if desired the conical plate can also be arranged to face in the opposite direction away from the nozzle.

In the embodiment of FIG. 5 of the drawings, the three-fluid atomizing nozzle 110 incorporates a deflector plate 112 which is convexly shaped or dished so as to have the convex surface extending towards the fluid discharge nozzle orifice 82, with the outer diameters or transverse dimensions of each of the plates 84, 92, 102 and 112 of each of the various embodiments being substantially of the same size.

The various dimensions for the nozzle would, of course, vary according to the end use requirements for which the nozzle is designed. The dimensions noted below are, however, illustrative of relative size of the nozzle dimensions and also represent the dimensions of the nozzle employed to obtain the test run data of Tables I and II.

Figure 6:
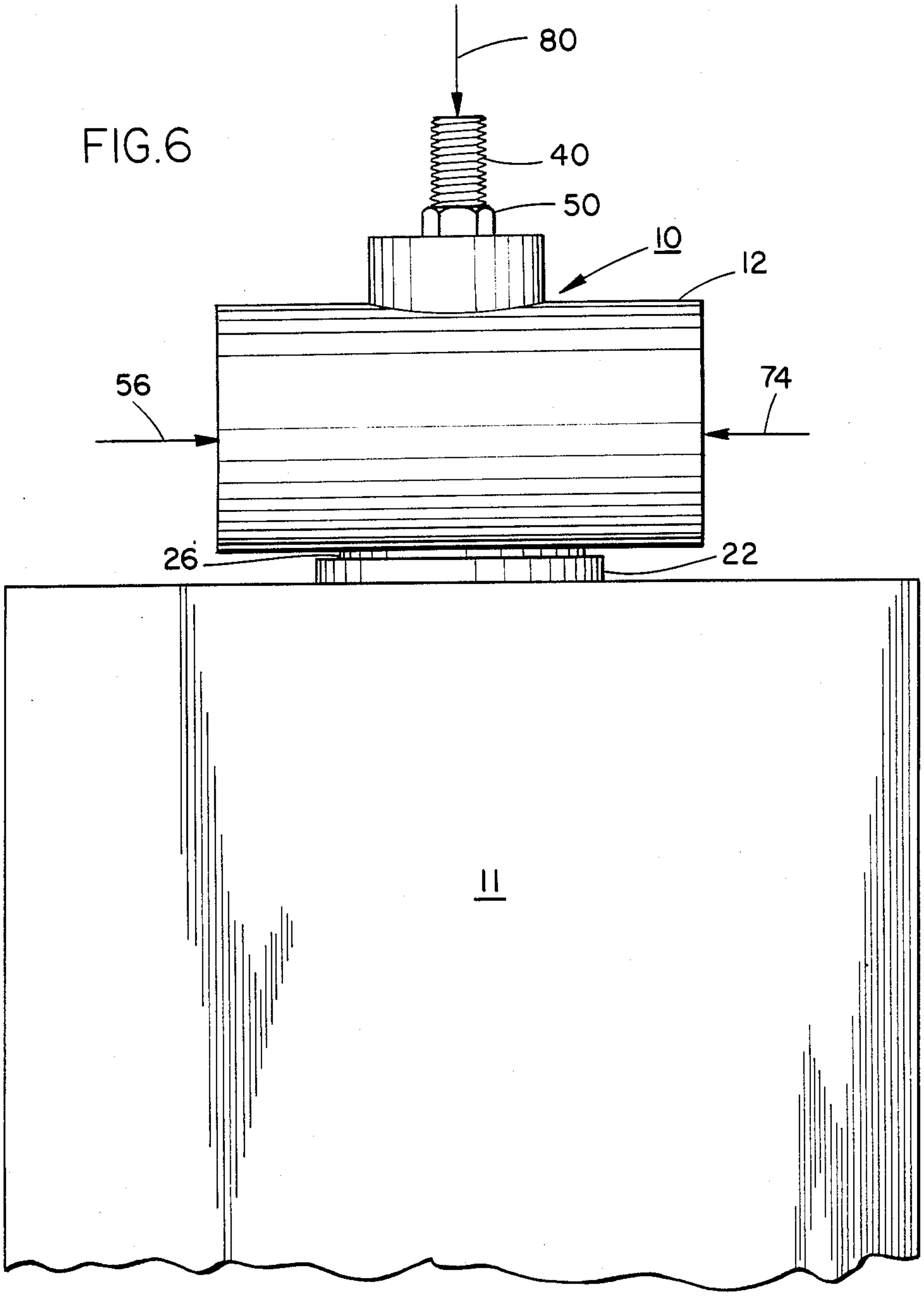
FIG. 6 is a longitudinal view showing the nozzle of FIG. 1 positioned in a drying tower of which only the top portion is shown.

FIG. 6 depicts nozzle 10 positioned within a spray-drying tower 11.

Orifice dimensions for the various discharge orifices of a three-fluid atomizing nozzle found useful in the practice of this invention include an orifice diameter for orifice 82, used for the inner atomizing fluid, of approximately $\frac{1}{4}$ inch. This atomizing fluid orifice 82 affords one method of controlling the amount of atomizing fluid needed for the first, coarse atomization of the liquid product. Although atomizing fluid orifices of different sizes can be employed, with the limits thereof being at the point in which either too much or too little of the inner atomizing fluid is supplied.

The outer diameter of the tubular member 40 is about 9/16 inch, with the inner diameter of bushing 22 thereabout being about $\frac{5}{8}$ inch, so that the annular liquid flow gap 46 or orifice width 76 is about 1/32 inch in width. This annular flow gap 46 controls the distribution of the liquid which forms a solid annual wall of liquid discharged downwardly through orifice 76. As this gap is made narrower, higher liquid feed pressures will be required for the nozzle.

The impact or deflector plate 84, 92, 102 or 112 of each of the embodiments, whose relative diameter and spacing downstream of the nozzle fluid orifice 42 is important, has a typical diameter of $\frac{5}{8}$ inch and is spaced at a distance of about $\frac{1}{2}$ inch from the nozzle orifice 42. Spacing of the defector plate will usually be between $\frac{1}{4}$ and $\frac{5}{8}$ inches as a distance of less than $\frac{1}{4}$ inch may lead to plugging of the nozzle and a distance in excess of $\frac{5}{8}$ inch will require a large flow of the atomizing fluid through slot 66.

Although the deflector plate must be at least equal with or larger in size than the diameter of the annular liquid orifice 76, it is smaller than the diameter of the outer fluid orifice 66. The atomizing fluid discharged from the outer annular orifice 66 must pass closely beyond the outer circumferential edge of the deflector plate without impinging thereon inasmuch as, if the outer atomizing fluid were to impinge against the deflector plate this would result in poor atomization of the liquid and cause product buildup on the plate; while on the other hand, if the outer atomizing fluid passes too far from the edge of the deflector plate, poor secondary atomization of the initially atomized liquid product will be effected.

The importance of the proper distancing of the deflector plate downstream of the nozzle orifice resides in that, if it is positioned too closely to the nozzle, any splash-back of atomized liquid on the nozzle will eventually produce nozzle fouling; whereas if the plate is positioned too far from the nozzle orifice, poor atomization will result due to less protection being afforded from the surrounding dryer environment, due to reduced mixture velocity and encountered predrying effects.

In the inventive three-fluid atomizing nozzle, both of the atomizing fluids are required inasmuch as without either one, there would be provided poor atomization of the liquid product and nozzle fouling due to the low feed pressures employed. Moreover, the feed pressure of the inner atomizing fluid should be higher than that of the outer atomizing fluid for satisfactory operation of the nozzle, with the actual pressures employed for, respectively, the first and second atomizing fluid being dependent upon the type of liquid product being atomized by means of the nozzle.

During the operation of the nozzle, any adjustment to the conditions of either of the two atomizing fluids affects the degree of atomization of the liquid and the obtained spray angle. For instance, under a certain set of operating parameters for a certain product; for instance, such as gelatin or coffee extract, there is produced a certain spray angle of X degrees relative to the vertical and extent of atomization. When only the outer atomizing fluid pressure, or flow rate thereof is increased, then the spray angle will become less than X and finer atomization of the liquid will be effected. On the other hand, if the outer fluid pressure is decreased, a spray angle which is larger than X will be produced, and a coarser atomization will be the result.

The three-fluid atomizing nozzle pursuant to the invention provides important advantages over conventional high-pressure and two-fluid atomizing nozzles, particularly with respect to the atomization of high viscosity liquids and high solids-containing solutions which are to be subjected to spray-drying, for example, in a spray-drying tower installation.

Thus, at a 55% solids coffee extract concentration, there would ordinarily be required a high-pressure atomizing nozzle with a feed pressure of at least 1000 psig for proper atomizing operation. In contrast therewith, with the use of the inventive three-fluid atomizing nozzle, less than 100 psig liquid feed pressure is required.

Furthermore, with two-step external atomization provided for by the present atomizing nozzle construction, there can be readily atomized high density solutions or slurries. With the prior art two-fluid nozzles, in particular nozzles provided for high viscosity liquid spray-drying, air is generally mixed internally of the nozzle with the liquid product so as to provide for atomization. This typically results in the obtention of low product densities.

The inventive three-fluid atomizing nozzle also will disperse extremely viscous and/or hard to atomize solutions, for example a 40% solids gelatin solution of 240 Bloom gelatin can be readily spray-dried with the three-fluid atomizing nozzle, whereas; with the use of a high pressure nozzle or two-fluid nozzle gelatin solutions containing more than 12% solids by weight are difficult or impossible to atomized.

For very high solids concentrations in the product liquid, such as concentrated coffee extract having a soluble solids content of from about 45% to about 75% by weight, after the low pressure atomization of this invention there is obtained almost solid, irregular particles. The ability to spray-dry aroma-containing food extracts at high concentrations is desirable as it is known that the amount of aromas which are retained in the dry powder is a direct function of the concentration of the extract being spray-dried.

The invention three-fluid atomizing nozzle also permits for the atomizing of higher feed concentrations which results in reduced drying costs because of reduced amounts of water which must be evaporated by the spray-dryer. Moreover, the inventive three-fluid atomizing nozzle can also be used for the spray-drying of a non-soluble suspension; for example, such as mashed potatoes.

The inventive three-fluid atomizing nozzle has been experimentally employed with success in the two-step atomization of extremely highly viscous and/or hard to spherize liquids possessing a high percentage of solids content. Thus, as mentioned hereinabove, it is known in the technology that it is extremely difficult to spray dry gelatin because of its tendency towards rapid surface drying of the material prior to completion of atomization. As taught in U.S. Pat. No. 2,824,807, this surface drying rate can be reduced by blowing cold air about the nozzle so as to reduce tower effects. However, even when employing this prior art technology, gelatin of up to 200 Bloom can be spray-dried at only about up to 12% solids concentration.

In contrast with the foregoing, by employing the inventive three-fluid atomizing nozzle, and its two step atomization gelatin (200 to 240 Bloom) has been spray-dried at up to 40% solids concentration. The three-fluid atomizing nozzle was operated employing steam at pressures between 90–150 psig as the inner atomizing fluid and air at pressures between 70–120 psig as the outer atomizing fluid. The steam, in this operational application, provides a required high humidity zone which prevents surface drying of the gelatin until atomization thereof is completed. When using air as the inner atomizing fluid for gelatin in lieu of steam, poor atomization results due to surface drying effects.

Tests have been conducted employing gelatin which was spray-dried on a #17 Anhydro Spray Dryer equipped with the three-fluid nozzle of this invention. Both Type A (240 Bloom) and Type B (200 Bloom) gelatin solutions at up to 30% solids concentration were dried. The product produced was granular and free flowing, with product moisture of below 5% and densities ranging from 10 to 13.5 lbs/ft$^3$. Bloom losses were less than 5% and there was no measurable loss in viscosity. All runs were evaluated using a DSC (differential scanning calorimeter) and the dried gelatin was found to be completely amorphous. Results of such actual test run data are set forth in Table I hereinbelow.

TABLE I

| | SPRAY DRIED GELATIN | | | | | | |
|---|---|---|---|---|---|---|---|
| RUN NO. | 1 | 2 | 3 | 4 | 5 | 6 | 7 |
| Feed Concentration (%) | 25 | 30 | 25 | 30 | 30 | 30 | 30 |
| Gelatin Type | B | B | A | A | A | B | B |
| Bloom | 200 | 200 | 240 | 240 | 240 | 200 | 200 |
| No. of Nozzles | 2 | 2 | 3 | 3 | 3 | 3 | 3 |
| Length of Run | 3 hrs. | 1 hr. | 2½ hrs. | 2 hrs. | ½ hr. | 4½ hrs. | 10½ hrs. |
| Other Comments | — | — | — | — | pH adjust. | — | — |
| Tower Conditions | | | | | | | |
| Gelatin Feed Pressure (psig) | 20 | 20 | 20 | 35–40 | 40 | 30 | 20–40 |
| Gelatin Feed Temp. (°F.) | 140 | 155 | 150 | 155 | 152 | 155 | 140–160 |
| Steam Pressure (psig) | 150 | 150 | 150 | 150 | 150 | 150 | 140 |
| Air Pressure (psig) | 80 | 80 | 80 | 80 | 80 | 80 | 80 |
| Dryer Inlet Air Temp. (°F.) | 350 | 300 | 300 | 300 | 300 | 320 | 320 |
| Dryer Outlet Air Temp. (°F.) | 280 | 270 | 260 | 255 | 255 | 270 | 260 |
| Air Broom Temp. (°F.) | | | | | | | |
| Tower Wall Cooling | ON | OFF | OFF | OFF | OFF | OFF | OFF |
| Product | | | | | | | |
| Collected −10 (lbs.) | 283 | 136 | 101 | 252 | 56 | 565 | 1129 |
| +10 overs | — | 23 | 19 | 41 | 7 | 158 | 134 |
| Density (lbs/ft.$^3$) | 11.9 | 12.7 | 11.9 | 12.7 | 10.3 | 13.5 | 13.5 |
| Moisture (% $H_2O$) | 4.2 | 4.5 | 3.8 | 4.2 | 5.2 | 4.4 | 3.0 |
| Bloom Loss (%) | 2.4 | 2.9 | 2.8 | 5.6 | — | 11.0 | 5.7 |

Tests were also carried out on the spray-drying of coffee extracts for the production of soluble coffee, and utilizing extracts with a solids concentration of as high as 70% by weight. The reason for this interest in the spray-drying of coffee extracts lies in that it has been determined that the higher the solids concentration in the liquid product feed, the higher the retention of volatiles in the coffee. High solids concentration extracts are currently being spray-dried, if at all, using high-pressure nozzles and elevated extract feed temperature.

In contrast therewith, the inventive three-fluid atomizing nozzle allows for the spray-drying of these extremely viscous coffee extracts while employing a very low liquid feed pressure. During testing, as set forth in Table II hereinbelow, coffee extracts with an as high as 70% solids concentration have been spray-dried using a liquid nozzle pressure of less than 100 psig. The three-fluid atomizing nozzle was operated employing an inner atomizing fluid of steam at 20–90 psig or air at 30–50 psig and an outer fluid of air at 5–50 psig. Excellent atomizing and drying results were obtained for all test runs.

The results as tabulated hereinbelow in Table II were excellent when extract containing up to 70% solids were spray-dried. The obtained atomized product had a mean particle size of 110 microns and a bulk density of 0.427 grams per cubic centimeter, which was lower than expected predicated on past work with prior art high pressure nozzles. During evaluations employing an SEM (scanning electron microscope), the coffee particles were found to be very unique being almost solid and very irregular in shape, whereas typical spray-dried powders are in the shape of hollow spheres.

TABLE II

| | SPRAY-DRIED COFFEE | | |
|---|---|---|---|
| RUN # | 1 | 2 | 3 |
| FEED CONCENTRATION (%) | 50 | 70 | 55 |

TABLE II-continued

| SPRAY-DRIED COFFEE | | | |
|---|---|---|---|
| RUN # | 1 | 2 | 3 |
| TOWER CONDITIONS | | | |
| Feed Pressure (psig) | 25 | 55 | 30 |
| Feed Temperature (°F.) | 140 | 160 | 135 |
| Inner Fluid | Steam | Steam | Air |
| Inner Fluid Press. (psig) | 35 | 75 | 40 |
| Outer Fluid | Air | Air | Air |
| Outer Fluid Press. (psig) | 6.5 | 40 | 7 |
| Dryer Inlet (°F.) | 360 | 310 | 320 |
| Dryer Outlet (°F.) | 228 | 230 | 210 |
| Product Rate Dry (#/hr.) | 150 | 194 | — |
| PRODUCT | | | |
| Moisture | 2.0 | 1.5 | 1.0 |
| Density (Bulk/gm/cc) | .259 | .457 | — |
| Particle Size Tower (microns) | 70 | 110 | — |
| Cyclone (microns) | 49 | 48 | — |

While there has been shown and described what are considered to be preferred embodiments of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. An arrangement for the atomization and spray-drying of a viscous liquid including a three-fluid atomizing nozzle having separate dispensing orifices for the downward discharge of three fluids, comprising:

(a) a three-fluid nozzle including an inner circular orifice for downwardly dispensing a flow of pressurized steam from said nozzle; a middle annular dispensing orifice concentrically encompassing said inner orifice for downwardly discharging a flow of a viscous liquid from said nozzle; and an outer annular dispensing orifice concentrically encompassing said middle annular dispensing orifice for downwardly discharging a flow of a pressurized air, said three orifices being positioned to preclude mixing of the inner steam or outer air flows with the viscous liquid within the nozzle and to effect an initial atomization of said viscous liquid by the steam flow externally of said nozzle;

(b) a circular deflector plate supported from said nozzle downstream of said dispensing orifices, said deflector plate extending transversely across the path of the steam and initially atomized viscous liquid and having a diameter at least as large as the diameter of the middle annular dispensing orifice to cause the steam and the initially atomized viscous liquid to impinge thereagainst and to be deflected in substantially radially outward directions, the downwardly directed flow of pressurized air from the outer annular orifice closely bypassing the outer circumference of said deflector plate and impinging against the radially outward flow of the steam and initially atomized liquid to thereby deflect the flow thereof into a generally downward flow path and to further atomize the liquid stream; and (c) a spray-drying tower for supplying a stream of heated air to contact and dry the further atomized particles.

2. An atomizing arrangement as claimed in claim 1, wherein said deflector plate has a diameter which is smaller than the diameter of said outer annular dispensing orifice.

3. An atomizing and spray drying arrangement as claimed in claim 2, wherein said circular deflector plate has a substantially planar surface facing said nozzle orifices.

4. An atomizing and spray drying arrangement as claimed in claim 2, wherein said circular deflector plate has a substantially concave dished surface facing said nozzle orifices.

5. An atomizing and spray drying arrangement as claimed in claim 2, wherein said circular deflector plate has a substantially convex dished surface facing said nozzle orifices.

6. An atomizing and spray drying arrangement as claimed in claim 2, wherein said circular deflector plate has a substantially conical surface having its central apex extending towards said nozzle orifices.

7. An atomizing and spray drying arrangement as claimed in claim 2, comprising a plurality of circumferentially-spaced connector means extending between the outer circumferential edge of said deflector plate and said nozzle for suspending said plate from said nozzle.

8. An atomizing and spray drying arrangement as claimed in claim 7, each said connector means comprising a thin metallic rod member.

9. An atomizing and spray drying arrangement as claimed in claim 1, wherein said circular deflector plate has a diameter of about $\frac{5}{8}$ inch and has the plane of the circumferential edge thereof spaced a distance of about $\frac{1}{2}$ inch below the inner dispensing orifice.

10. An atomizing and spray drying arrangement as claimed in claim 9, wherein the inner circular dispensing orifice has a diameter of about $\frac{1}{4}$ inch, the middle annular dispensing orifice has an inner diameter of about 9/16 inch and an outer diameter of about $\frac{5}{8}$ inch; and the outer annual dispensing orifice has an inner diameter of about 1 inch and an outer diameter of about $1\frac{1}{8}$ inches.

11. An atomizing and spray drying arrangement as claimed in claim 1, wherein said nozzle is essentially constructed for stainless steel.

12. A method for spray drying a viscous liquid through the intermediary of a three-fluid atomizing nozzle having separate dispensing orifices for the downward discharge of three fluids; comprising the steps of:

(a) discharging a flow of pressurized steam from an inner circular orifice of said nozzle; discharging a flow of a viscous liquid from a middle annular dispensing orifice concentrically encompassing said inner orifice; and discharging a flow of pressurized air from an outer annular dispensing orifice concentrically encompassing said middle annular dispensing orifice, said three orifices being positioned to preclude mixing of the steam of air flows with the viscous liquid within said nozzle and to effect an initial atomization of the viscous liquid by the steam flow externally of said nozzle;

(b) causing the steam flow and the initially atomized viscous liquid to impinge against a circular deflector plate supported from said nozzle downstream of said dispensing orifices, said deflector plate extending transversely across the flow path of the steam and initially atomized viscous liquid and having a diameter at least as large as the outer diameter of the middle annular dispensing orifice so as to deflect said flow in substantially radially outward directions, the downwardly directed flow of the pressurized air closely bypassing the outer circumference of said deflector plate and impinging against the radially outward flow of the steam and atomized liquid to thereby deflect said flow into a generally downward flow path and to further atomize the initially atomized viscous liquid; and thereafter (c) contacting the further atomized liquid with a stream of heated air in order to dry the atomized particles.

13. A method as claimed in claim 12, comprising discharging the steam from said inner circular orifice at a pressure higher than that of the air being discharged from said outer annular dispensing orifice.

14. A method as claimed in claim 12, wherein the viscous liquid is constituted of a gelatin dispersion or solution having a solids concentration of about 25% to 40% by weight, the steam is discharged at a pressure of about 90 to 150 psig, and the air is discharged at a pressure of about 70 to 120 psig.

15. A method as claimed in claim 12, wherein the viscous liquid is constituted of an aqueous coffee extract having a solids concentration of up to about 75% by weight, the steam is discharged at a pressure of about 20 to 90 psig, and the air is discharged at a pressure of about 5 to 50 psig.

* * * * *